2,820,828
PREPARATION OF N-NITROSYLHYDROXYL-
AMINOPHENOLS

Milton J. Hogsed, Wilmington, Del., assignor to E. I. du Pont de Nemours and Company, Wilmington, Del., a corporation of Delaware No Drawing. Application May 4, 1955
Serial No. 506,089

9 Claims. (Cl. 260—571)

The N-nitroso-substituted hydroxylaminophenols are an interesting class of chemical compounds because of their ability to form chelates possessing selective solubility characteristics. This property makes them potentially useful in the mining industry for effecting separations of metals from mixtures in which they are present as oxides, sulfides, or salts. The known method for preparing these N-nitroso-substituted hydroxylaminophenols has involved a relatively expensive multiple-step operation which includes (1) nitration of phenol, (2) tosylation of the nitrophenol with p-toluene sulfonyl chloride, (3) reduction of the tosylated nitrophenol with zinc and ammonium chloride to the hydroxylaminotosylate, (4) nitrosation of the hydroxylaminotosylate with amyl nitrite, and (5) removal of the tosyl group (Ts) by treatment with strong alkali. Schematically the process is as follows:

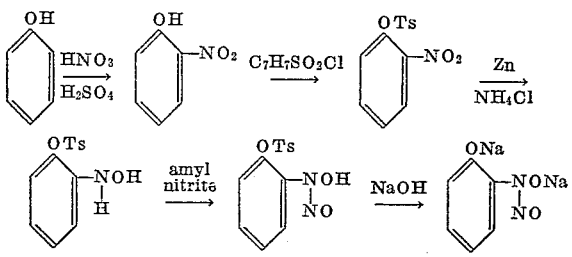

Multiplication of steps reduces yields of desired product in addition to increasing the cost of operation. A much simpler synthesis of nitroso-substituted hydroxylaminophenols is required for commercial production.

It is an object of this invention to provide a commercially practical process for producing N-nitroso-substituted hydroxylaminophenols directly from a monohydric arylhydroxide. Other objects of the invention will become apparent from the specification and claims.

The process of this invention comprises the reaction of a monohydric arylhydroxide in solution in an inert solvent as an alkali or alkaline earth metal salt, i. e., a phenoxide solution, with nitric oxide at a temperature in the range of 0° to 50° C. to produce an N-nitrosylhydroxylaminophenol directly in a single step.

In a convenient way of operating, a pressure reactor is charged with an aqueous solution of a phenoxide. The reactor is swept with oxygen-free nitrogen and evacuated. Nitric oxide is then introduced into the evacuated reactor to a pressure within the range of 100 to 1000 lb./sq. in. and the temperature is maintained between 0° and 50° C. until reaction is complete, as evidenced by cessation of pressure drop. The product, which crystallizes from solution, is isolated by filtration and is dried, preferably under vacuum.

The examples which follow are submitted to illustrate and not to limit this invention. Parts are by weight.

Example I

A solution of 10 parts of phenol and 5 parts of sodium hydroxide in 20 parts of water was placed in a pressure reactor having a capacity of 150 parts of water and pressured with nitric oxide to 500 lbs. total pressure. A total of 4.7 parts of nitric oxide was absorbed within 1.5 hours at 25° C. The reactor was then opened, discharged, the contents filtered and the solid on the filter washed with methanol. There was obtained 11 parts of the sodium salt of N-nitrosylhydroxylaminophenol, analyzing as follows:

Analysis.—Calc'd for $C_6H_5O_3N_2Na$: C. 40.9; H, 2.8; N, 15.9; Na, 13.1. Found: C, 40.0; H, 3.2; N, 16.4; Na, 12.9.

Example II

An aqueous solution of 5 parts of phenol and 9.5 parts of barium hydroxide octahydrate, in enough distilled water to give a volume equal to that of 37 parts of water, was reacted with nitric oxide at 500 lb./sq. in. at room temperature for 3 hours. There was obtained 8 parts of an insoluble, slightly yellow powder which was a 1:2 mixture of the barium salts of N-nitrosylhydroxylaminophenol, $(C_6H_5O_3N_2)_2Ba$ and $C_6H_5O_3N_2Ba$. The product analyzed 38.7% Ba and 9.1% N.

Example III

A solution of 9.5 parts of phenol and 6 parts of potassium hydroxide in 16.2 parts of methanol was reacted with nitric oxide at 500 lb./sq. in. and 25° C. for 5 hours. There was obtained 10 parts of a methanol-insoluble salt. The salt was dissolved in 50 parts of water, filtered and cooled to —5° C. and acidified with 3 parts of a 1:1 by volume sulfuric acid-water mixture. The N-nitrosylhydroxylaminophenol that was liberated was extracted with ether which had been cooled to 0° C. Water was removed by drying the ether solution over anhydrous magnesium sulfate and filtering. The ether solution was cooled to —5° C. and a slow stream of ammonia was then passed through the ether solution. The yellow ammonium salt which separated was removed by filtration and dried by passing a stream of dry nitrogen through the filter cake. There was obtained 4.5 parts of the ammonium salt of N-nitrosylhydroxylaminophenol. The product analyzed as follows:

Analysis.—Calc'd for $C_6H_9O_3N_3$: C. 42.1; H, 5.3; N, 24.5. Found: C, 41.8; H, 5.1; N, 22.5.

Example IV

A solution of 11 parts of p-cresol and 4 parts of sodium hydroxide in 20 parts of water was reacted with nitric oxide at room temperature and 500 lb./sq. in. for 3 hours. The solid obtained by filtration was washed repeatedly with ethanol and finally with ether. After drying, the product weighed 2 parts and had the correct elementary composition for the sodium salt of ortho-N-nitrosylhydroxylamino-p-methylphenol.

Analysis.—Calc'd for $C_7H_7O_3N_2Na$: C, 44.2; H, 3.7; N, 14.7. Found: C, 43.7; H, 3.9; N, 14.2.

Example V

A solution of 14.5 parts of α-naphthol and 4 parts of sodium hydroxide in 20 parts of water was reacted with nitric oxide at 500 lb./sq. in. at room temperature for 3 hours. The solid obtained by filtration was washed with methanol and with ether and was then dried. There was obtained 6 parts of the sodium salt of N-nitrosylhydroxylamino-α-naphthol.

Example VI

A solution of 14.5 parts of β-naphthol and 8 parts of sodium hydroxide in 20 parts of water was reacted with nitric oxide at 500 lb./sq. in. at room temperature for 3 hours. An aqueous solution of the product was saturated with carbon dioxide and filtered. The filtrate was cooled to 0° C., acidified, and ether-extracted. The ammonium salt was prepared by passing ammonia through the cold ether solution. There was obtained 9 parts of the ammonium salt of N-nitrosylhydroxylamino-β-naphthol.

The phenoxides which are useful in the process of this invention are the alkali and alkaline earth metal salts of monohydric arylhydroxides, which are wholly hydrocarbon except for the single phenolic oxygen atom. Examples of such phenoxides are the salts of phenol, cresols, xylenols, naphthols, thymol, 1,2-diethyl-4-hydroxybenzene, and the like.

The alkali and alkaline earth metals which will usually be employed in preparing the phenoxides are sodium, potassium, lithium, barium, calcium and magnesium. Of these sodium phenoxide is preferred because of its availability, low cost, and good water-solubility characteristics.

These phenoxides are conveniently made by dissolving the phenol in water containing the alkali or alkaline earth metal hydroxide. Any other method known to those skilled in the art may be used however.

The reaction is preferably conducted in an aqueous medium having a concentration of phenoxide approximating saturation in the water solution in order that the nitroso-substituted hydroxylaminophenol may separate from solution as it is formed. The particular concentration used depends upon the nature of the phenoxide used.

The nitrosation is effected at from 0° to 50° C. and preferably between 10° and 25° C.

The pressure employed is that required to bring about reaction at a practical rate with safety. These two objectives are attained at pressures up to 1000 lb./sq. in. Usually, however, the most favorable conditions are attained within the range of 500 to 800 lb./sq. in. pressure and this embraces the preferred conditions.

The nitrosation is effected with nitric oxide in an oxygen-free atmosphere. This is essential because of the susceptibility of the nitric oxide to oxidation. The nitric oxide employed in the nitrosation may be obtained from any source but should be of a high degree of purity.

The nitroso-substituted hydroxylaminophenols are known compounds. These compounds are metal sequestering agents and are potentially useful in mining and similar operations. The effectiveness of these compounds in removing such ions from solution as ferric, titanyl, and cupric is illustrated below:

Aqueous solutions of ferric, titanic, and cupric salts were prepared. To each of these solutions there was added an excess of the sodium salt of the product of Example V in chloroform. The chloroform layer was then separated and the aqueous layer tested for these ions, with negative results. This shows that the removal of these ions from solution is quantitative.

The process of this invention makes the nitrosylhydroxylaminophenols available at potentially low cost by providing a simple one-step synthesis employing low cost, available nitric oxide. It is therefore a marked advance over previously known methods for preparing these compounds.

Since many different embodiments of the invention may be made without departing from the spirit and scope thereof, it is to be understood that the invention is not limited by the specific illustrations except to the extent defined in the following claims.

What is claimed is:

1. A process for producing an N-nitrosylhydroxylaminophenol, from a monohydric arylhydroxide which is wholly hydrocarbon except for the single phenolic oxygen atom, which comprises forming an aqueous solution of a phenoxide selected from the group consisting of alkali and alkaline earth metal salts of said monohydric arylhydroxide, introducing oxygen-free nitric oxide into the solution at a pressure of 100 to 1000 pounds per square inch, reacting the phenoxide with the nitric oxide at a temperature of 0° to 50° C. to form an N-nitrosylhydroxylaminophenol, and isolating the product.

2. A process as defined in claim 1 wherein said phenoxide is a sodium salt of a monohydric arylhydroxide which is wholly hydrocarbon except for the single phenolic oxygen atom.

3. A process as defined in claim 1 wherein said phenoxide is sodium phenate.

4. A process as defined in claim 1 wherein said phenoxide is a potassium phenate.

5. A process as defined in claim 1 wherein said phenoxide is a sodium cresylate.

6. A process as defined in claim 1 wherein said phenoxide is a sodium naphtholate.

7. A process as defined in claim 1 wherein said solution is approximately saturated with the phenoxide.

8. A process as defined in claim 1 wherein said pressure is 500 to 800 pounds per square inch.

9. A process as defined in claim 1 wherein said reaction temperature is 10° to 25° C.

References Cited in the file of this patent

UNITED STATES PATENTS 1,502,849   Ehrlich _____ July 29, 1924

OTHER REFERENCES

Berichte, 33:1024.